Nov. 15, 1932.   J. E. BURNS ET AL   1,887,920
REFINING APPARATUS AND PROCESS
Filed Nov. 16, 1926

INVENTORS
JAMES E. BURNS
WATSON H. WOODFORD
BY
ATTORNEYS

Patented Nov. 15, 1932

1,887,920

UNITED STATES PATENT OFFICE

JAMES E. BURNS AND WATSON H. WOODFORD, OF BRIDGEPORT, CONNECTICUT, ASSIGNORS TO REMINGTON ARMS COMPANY, INC., A CORPORATION OF DELAWARE

REFINING APPARATUS AND PROCESS

Application filed November 16, 1926. Serial No. 148,703.

This invention relates to the purification of materials, and especially to a process of purification or refining in which a compound containing impurities is refined by fusing in the presence of one of the ingredients of the compound, the free ingredient serving to combine with the impurities which are liberated in the fusing process.

The invention further contemplates a process for the refining of materials by fusing which includes the continuous removal of the part of the material which is fused, thereby obviating the necessity for bringing the entire mass of the crude material to a liquid or molten condition. The invention will be described with particular reference to the refining of crude antimony sulphide, though it is to be understood that it is of general utility and is not limited to the purification of this particular substance.

Crude antimony sulphide, as it is sold commercially, is a friable substance of a dark dull slate color, having a varying, coarse texture, and very low mechanical strength. It has a very low heat conductivity, especially when pulverized. It contains from 10 to 25% of impurities consisting chiefly of antimony oxide.

In certain commercial uses of antimony sulphide, such for example as its use as an ingredient of priming or detonating mixtures, the material is ground to a desired fineness and screened to eliminate "fines" whose presence would render the mass too dense for rapid reaction with the other ingredients of the mixture. Prior to the present invention the recovery of the fines has been considered impracticable. Attempts to fuse them have resulted in such an increase in the oxide content that the material quickly became unfit for use. It has, moreover, been impracticable to secure antimony sulphide in castings or blocks of homogeneous character and fine texture on account of the tendency of the material to boil at any temperature at which a substantial quantity thereof can be reduced to a molten condition. The crude or pulverized substance is of such low heat conductivity that in order to fuse any appreciable quantity it is necessary to heat it to a temperature several hundred degrees above the temperature at which it first begins to melt. At these high temperatures the substance boils freely and oxidation proceeds rapidly, making both the production of homogeneous casting and of pure antimony sulphide impracticable.

The present invention contemplates the substantially complete purification of crude antimony sulphide, and likewise a process and apparatus by which waste finely pulverized antimony sulphide may be fused and reclaimed while increasing rather than decreasing its purity.

The drawing represents generally an apparatus constructed according to and for the practice of the present invention. In said drawing:—

Figure 2:
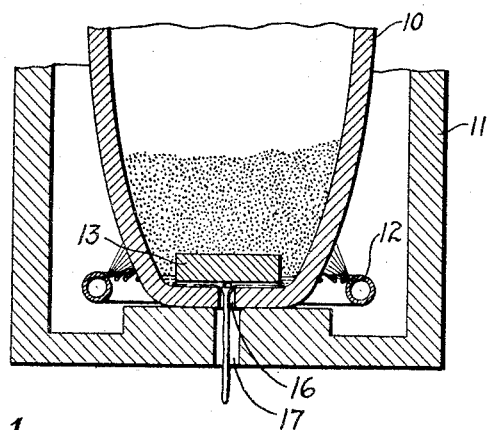
Fig. 2 is an inverted plan view of an element of the melting crucible.
Figure 1:
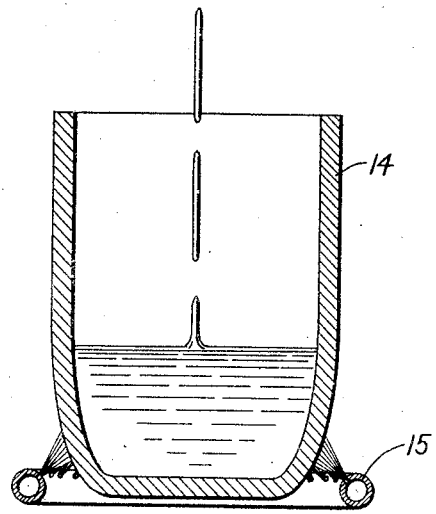
Fig. 1 is a fragmentary sectional elevation of the apparatus.

The process of the present invention contemplates as one feature thereof the fusing of crude or finely pulverized antimony sulphide in the presence of sulphur. The sulphur not only reduces the antimony oxide and combines with the oxygen thereof, but also combines with the liberated antimony, both reactions serving to increase the purity of the antimony sulphide. Preferably an excess of sulphur is used, and the molten material containing excess sulphur is exposed to the air to permit vaporization of the sulphur. The sulphur used is finely pulverized, the form commonly called "flowers of sulphur" being preferred. For ordinary crude antimony sulphide, about $3\frac{6}{10}$ pounds of sulphur per hundred pounds of antimony sulphide has been found to give the most satisfactory results. These figures, however, are to be understood as illustrative only, and not as restricting the scope of the invention.

To obviate the necessity, hereinbefore mentioned, for raising the temperature of the substance to or above its boiling point in order to liquefy an appreciable quantity thereof, the present invention contemplates continuously withdrawing the fluid substance as it becomes molten, thereby constantly maintaining the solid to be liquefied in close proximity to the source of heat. The withdrawal of the liquid, moreover, is so regulated and controlled as to prevent the escape therewith of pulverized solid material. One form of apparatus for the purpose is shown in the drawing.

A crucible 10 for the mixture of crude material and sulphur, is placed in a suitable heating furnace 11, heated from any convenient source of heat such as a gas burner 12. The crucible comprises one or more openings 16 at or near its base and aligned with openings 17 in the furnace wall, from which the fluid material may escape as it is liquefied. In order to prevent rapid movement of the liquid material from carrying with it particles of solid pulverized antimony sulphide, the opening in the base of the crucible is shielded by a suitable device 13 provided with elongated conduits of restricted area communicating with the opening in the bottom of the crucible. One form of shield comprises a block of refractory material such as corundum having on its lower face one or more grooves. This block is placed in the bottom of the crucible with its groove communicating with the opening in the crucible. The molten material, thus conducted through passages of comparatively restricted cross-sectional area and substantial length, escapes slowly, and the washing along with the liquid stream of solid particles is prevented.

By thus drawing off the liquid antimony sulphide substantially as rapidly as it is formed, the entire content of the crucible may be liquefied at a temperature far below that which is necessary, when the liquid material is retained in the crucible. In actual practice it has been found that by applicant's method, molten antimony sulphide can be produced at a temperature as low as 1150° F., whereas if the entire mass is retained in the crucible in which it is liquefied, it is necessary to raise the temperature to about 1850° F. At lower temperatures the material shows no tendency to boil and slight tendency to oxidize. When sulphur is used as above set forth, substantially all the oxide present is reduced by the sulphur.

The liquid material escaping from the melting crucible is permitted to drop a distance through the air in order to vaporize the excess sulphur, and is collected in a receiving crucible 14 which by means of a suitable burner 15 is maintained at a temperature well below the boiling point, but which is sufficient to keep the antimony sulphide in a liquid state. A quantity of liquid antimony sulphide at this temperature is thus secured. A thin film of antimony oxide forms upon the surface and protects the mass of quiescent liquid from further oxidation. This film may be skimmed off immediately before casting the melt. When a sufficient quantity of the melt has been accumulated in the receiving crucible it may be poured into molds. The resulting cast is homogeneous in character, of fine, somewhat fibrous texture, lead gray in color, and has a metallic luster. It is from 94% to 97% pure, and contains from 27% to 28% combined sulphur, part of the remaining impurity being sandy or other foreign material not removed in the smelting of the crude material from its ores.

The representative examples of the process and apparatus which have been described in detail are to be considered merely as typical illustrations, the invention being susceptible of a wide variety of applications, all falling within the scope of the appended claims.

What is claimed is:

1. The method of refining crude antimony sulphide which comprises melting in the presence of sulphur in a crucible and drawing off the molten product as it is melted.

2. The method of refining crude antimony sulphide which comprises melting a mixture of the crude material with sulphur, exposing the melt in an attenuated stream to air, and collecting and casting the melt.

3. The method of refining crude antimony sulphide which comprises the step of heating the crude material with sulphur in a crucible to a temperature at which no boiling takes place and drawing off the fluid material as it is melted.

4. The method of reclaiming finely pulverized and waste antimony sulphide which comprises melting said material with sulphur, and drawing off the melt as it is formed in a manner which does not permit the escape of unmelted sulphide with the melt.

JAMES E. BURNS.
WATSON H. WOODFORD.